(12) United States Patent
Takeda et al.

(10) Patent No.: US 9,419,771 B2
(45) Date of Patent: Aug. 16, 2016

(54) COMMUNICATION SYSTEM, BASE STATION APPARATUS, MOBILE TERMINAL APPARATUS AND COMMUNICATION METHOD

(71) Applicant: NTT DOCOMO, INC., Tokyo (JP)

(72) Inventors: Kazuaki Takeda, Tokyo (JP); Yoshihisa Kishiyama, Tokyo (JP); Sadayuki Abeta, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 39 days.

(21) Appl. No.: 14/374,966

(22) PCT Filed: Jan. 30, 2013

(86) PCT No.: PCT/JP2013/052063
§ 371 (c)(1),
(2) Date: Jul. 28, 2014

(87) PCT Pub. No.: WO2013/115259
PCT Pub. Date: Aug. 8, 2013

(65) Prior Publication Data
US 2014/0369223 A1 Dec. 18, 2014

(30) Foreign Application Priority Data
Jan. 30, 2012 (JP) ................................. 2012-017358

(51) Int. Cl.
*H04W 88/02* (2009.01)
*H04L 5/00* (2006.01)
(Continued)

(52) U.S. Cl.
CPC ........... *H04L 5/0073* (2013.01); *H04J 11/0093* (2013.01); *H04L 5/001* (2013.01);
(Continued)

(58) Field of Classification Search
CPC ...... H04J 11/0093; H04L 5/005; H04L 5/001; H04L 5/0035; H04W 72/042
See application file for complete search history.

(56) References Cited

U.S. PATENT DOCUMENTS

2005/0085214 A1* 4/2005 Laroia .................. H04L 5/0039
455/403
2011/0122789 A1* 5/2011 Haustein ............... H04L 5/0007
370/252

(Continued)

OTHER PUBLICATIONS

International Search Report for corresponding International Application No. PCT/JP2013/052063, mailed Mar. 5, 2013 (1 page).

(Continued)

*Primary Examiner* — Khaled Kassim
*Assistant Examiner* — Syed S Ali
(74) *Attorney, Agent, or Firm* — Osha Liang LLP

(57) ABSTRACT

The present invention is designed to detect an S-cell efficiently, in a short time, upon carrier aggregation in a HetNet. In a communication system where carrier aggregation is executed between a first carrier (CC #1) and a second carrier (CC #2), a macro base station apparatus (20A) generates a carrier detection signal that makes a mobile terminal apparatus (10) detect the second carrier (CC #2), such that carrier aggregation is executed with the first carrier (CC #1), and transmits the carrier detection signal to an RRH base station apparatus (20B) such that the carrier detection signal is transmitted from the RRH base station apparatus (20B) to the mobile terminal apparatus (10) in the second carrier (CC #2) in which the carrier detection signal can be allocated with a higher density than a reference signal of the first carrier (CC #1). The macro base station apparatus (20A) detects an S-cell based on the received quality of the carrier detection signal fed back from the mobile terminal apparatus (10).

7 Claims, 13 Drawing Sheets

(51) Int. Cl.
*H04J 11/00* (2006.01)
*H04W 24/08* (2009.01)
*H04W 72/04* (2009.01)

(52) U.S. Cl.
CPC .............. *H04L 5/005* (2013.01); *H04W 24/08* (2013.01); *H04W 72/042* (2013.01); *H04L 5/0035* (2013.01); *H04W 88/02* (2013.01)

(56) References Cited

U.S. PATENT DOCUMENTS

| | | | |
|---|---|---|---|
| 2011/0207477 A1* | 8/2011 | Siomina | G01S 5/0278 455/456.2 |
| 2011/0319025 A1* | 12/2011 | Siomina | H04B 7/024 455/63.1 |
| 2012/0082124 A1* | 4/2012 | Kwon | H04L 5/0007 370/329 |
| 2012/0176885 A1* | 7/2012 | Lee | H04J 13/0048 370/209 |
| 2013/0155891 A1* | 6/2013 | Dinan | H04B 7/0456 370/252 |
| 2013/0188531 A1* | 7/2013 | Zhang | H04L 5/0007 370/280 |
| 2013/0215838 A1* | 8/2013 | Aiba | H04W 72/1231 370/329 |
| 2014/0233663 A1* | 8/2014 | Kang | H04L 5/0037 375/260 |
| 2015/0043520 A1* | 2/2015 | Sun | H04L 5/001 370/330 |
| 2015/0223265 A1* | 8/2015 | Fwu | H04W 52/04 370/329 |
| 2015/0304076 A1* | 10/2015 | Lee | H04L 5/005 370/329 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

* cited by examiner

0 #1 #2 #3 #4 #5 #6 #7 #8 #9 #10 #11 #12 #13
⊠ CRS      ▨ PRS

| | NOTE | VALUE |
|---|---|---|
| $N_{RB}^{PRS}$ | BW FOR PRS | 6,15,25,50,75,100 |
| $I_{PRS}$ | CONFIGURATION INDEX PRS SUBFRAME (PERIOD,OFFSET) | 0-4095 |
| $N_{PRS}$ | NUMBER OF CONSECUTIVE PRS SUBFRAMES | 1,2,4,6 |
| PRS-MUTING INFO | MUTING PATTERN COUNTED IN PRS OCCASION | BITMAP WITH THE SIZE OF 1,4,8,16 |

COMMUNICATION SYSTEM, BASE STATION APPARATUS, MOBILE TERMINAL APPARATUS AND COMMUNICATION METHOD

TECHNICAL FIELD

The present invention relates to a base station apparatus, a mobile terminal apparatus, a communication system and a communication method in a next-generation mobile communication system.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme based on OFDMA (Orthogonal Frequency Division Multiple Access) is used on the downlink, and a scheme based on SC-FDMA (Single Carrier Frequency Division Multiple Access) is used on the uplink.

Also, successor systems of LTE (referred to as, for example, "LTE-Advanced" or "LTE enhancement" (hereinafter referred to as "LTE-A")) are under study for the purposes of further broadbandization and increased speed beyond LTE. In LTE-A (Rel-10), carrier aggregation, which groups a plurality of component carriers (CCs), where the system band of the LTE system is one unit, for broadbandization, is used. Also, in LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF INVENTION

Technical Problem

Now, with future systems (Rel-11 and later versions), carrier aggregation to take into account improvement of spectral efficiency and reduction of interference caused in a HetNet is anticipated. To detect S-cells (secondary cells) in carrier aggregation in a HetNet, the signal quality from each pico cell is compared in a mobile terminal apparatus while connection with the macro cell is maintained. In the mobile terminal apparatus, after the synchronization signal from each pico cell has been captured, the signal quality from each pico cell is measured based on CRSs (Cell-specific Reference Signals) and so on, and therefore there is a problem that the measurement takes a long time.

The present invention has been made in view of the above, and it is therefore an object of the present invention to provide a communication system, a base station apparatus, a mobile terminal apparatus and a communication method that are suitable for carrier aggregation in a HetNet.

Solution to Problem

A communication system according to the present invention is a communication system in which, through carrier aggregation using a first carrier and a second carrier that is allocated in addition to the first carrier, a first base station apparatus and a mobile terminal apparatus communicate using the first carrier, and also a second base station apparatus and the mobile terminal apparatus communicate using the second carrier, and, in this communication system: the first base station apparatus has: a generating section that generates a carrier detection signal to make the mobile terminal apparatus detect the second carrier, such that the carrier aggregation is executed with the first carrier; and a transmission section that transmits the carrier detection signal to the second base station apparatus, such that the carrier detection signal is transmitted from the second base station apparatus to the mobile terminal apparatus using the second carrier in which the carrier detection signal can be allocated with a higher density than a reference signal of the first carrier; and the mobile terminal apparatus has: a receiving section that receives the carrier detection signal from the second base station apparatus.

Technical Advantage of the Invention

According to the present invention, carrier detection signals are transmitted from a second base station apparatus to a mobile terminal apparatus in a second carrier with a higher density than the reference signals of a first carrier. As a result, the signal quality from the second base station apparatus, measured with the carrier detection signals, improves in the mobile terminal apparatus, and the effort for measuring received quality in the mobile terminal apparatus is lightened. Consequently, the mobile terminal apparatus is able to detect the second carrier (S-cell), where carrier aggregation is executed with the first carrier (P-cell), in a short time, and reduce the power consumption.

DESCRIPTION OF EMBODIMENTS

Figure 1:
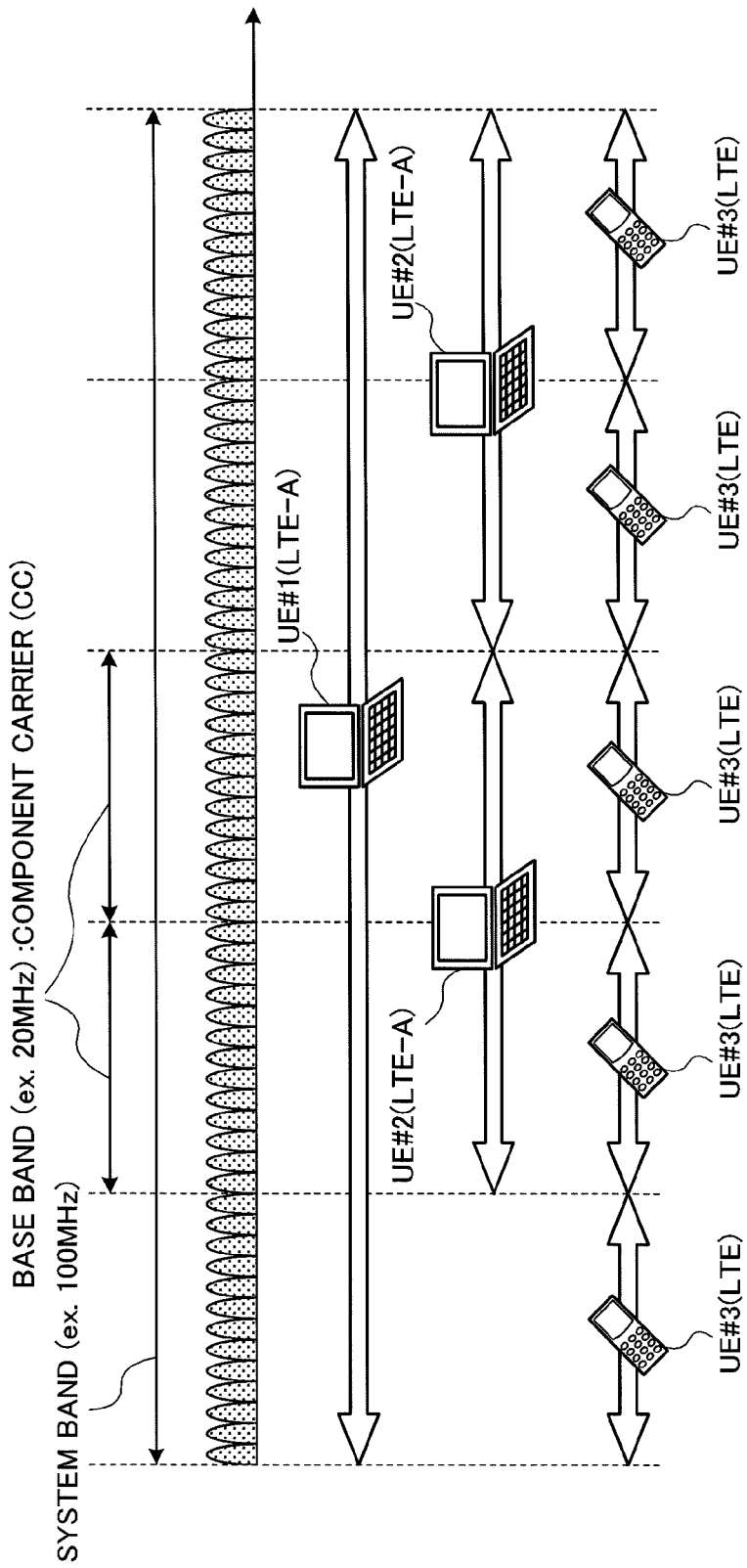
FIG. 1 is a diagram to explain a system band in an LTE-A system.

FIG. 1 is a diagram to show a layered bandwidth configuration defined in LTE-A. The example shown in FIG. 1 is a layered bandwidth configuration, in which an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Future systems (Rel-11 and later versions) anticipate extension of carrier aggregation, for specific use with respect to a HetNet. To be more specific, system configurations such as the ones shown in FIG. 2 may be possible. FIG. 2 provides diagrams to show examples of carrier aggregation in a HetNet.

Figure 2A:
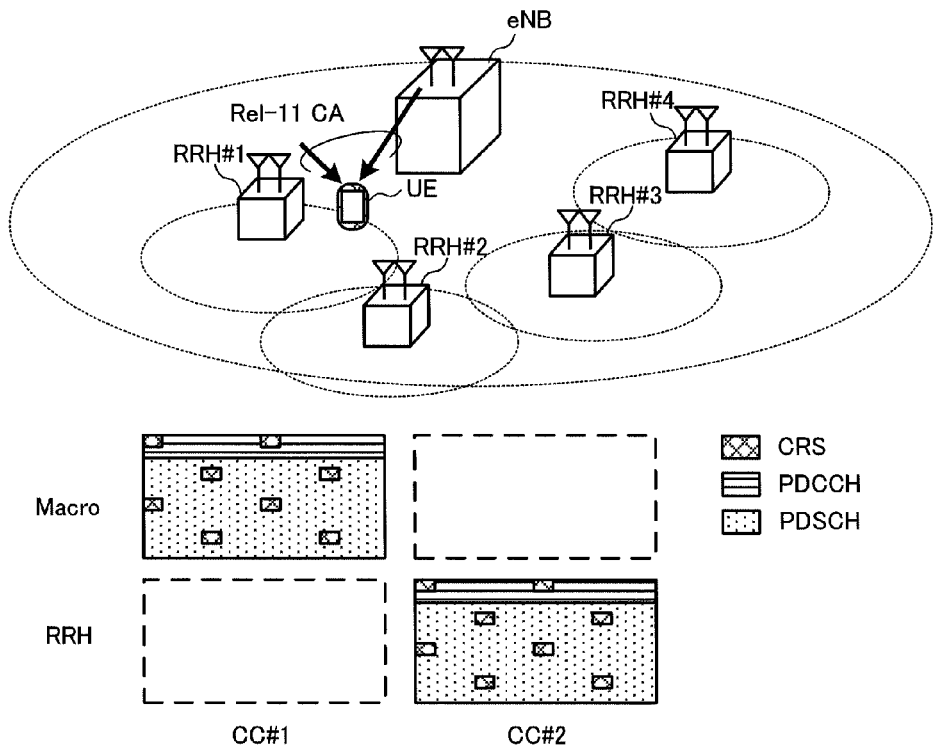
FIG. 2 provides diagrams to show examples of carrier aggregation in a HetNet.

The system shown in FIG. 2A is formed in layers with a base station apparatus eNB (eNodeB) and a plurality of base station apparatuses RRH (Remote Radio Head). In the cell of the base station apparatus eNB, small cells are formed by the base station apparatuses RRH in a localized manner. A mobile terminal apparatus UE is located in the small cell of base station apparatus RRH #1, and communicates with the base station apparatus eNB and base station apparatus RRH #1 through carrier aggregation. For example, carrier aggregation is executed using component carrier CC #1 of the base station apparatus eNB as a P-cell, and using component carrier CC #2 of base station apparatus RRH #1 as an S-cell.

Figure 2B:
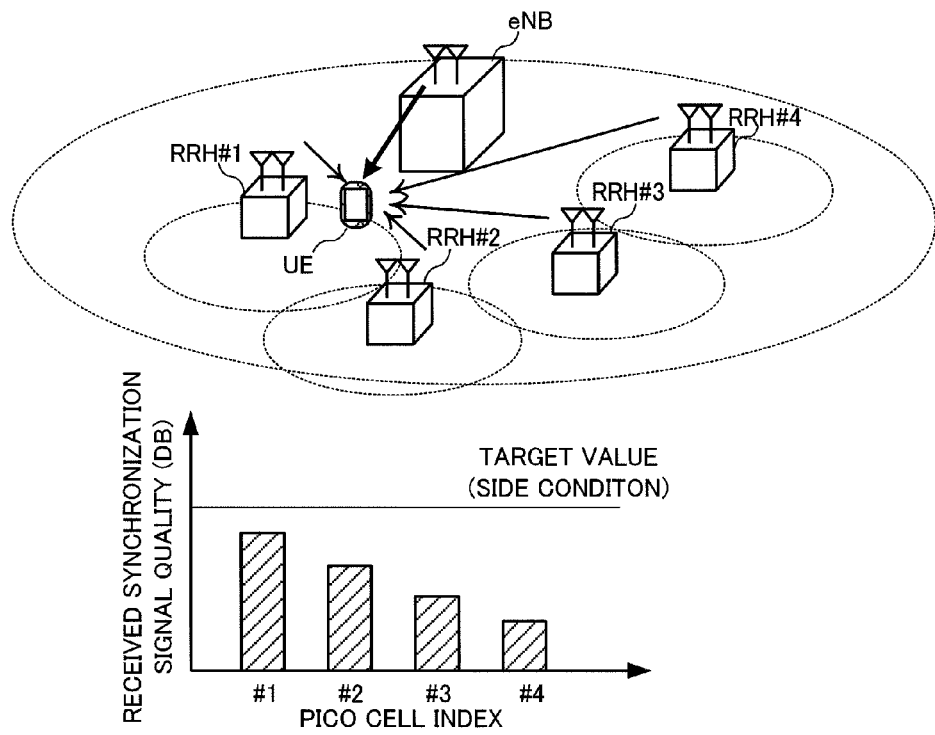

As shown in FIG. 2B, to execute this carrier aggregation, a mobile terminal apparatus UE needs to discover (detect) base station apparatuses RRH (S-cells) through inter-frequency measurement, while being connected with the base station apparatus eNB. With mobile terminal apparatuses UE of Rel-10 and earlier versions, after synchronization is captured with a PSS/SSS (Primary Synchronization Signal/Secondary Synchronization Signal), which are synchronization signals, the inter-frequency received quality from each base station apparatus RRH is measured with CRSs (Cell-specific Reference Signals). Then, the measured signal quality from each base station apparatus RRH and a predetermined target value are compared, and a base station apparatus RRH (S-cell) of good received quality is detected. With this method, the synchronization signals cause significant interference and the CRSs are received in insufficient density, and therefore the measurement takes a long time.

Figure 3:
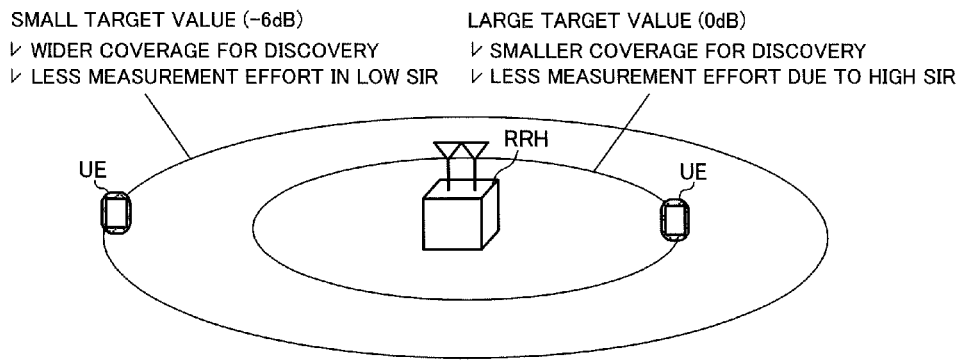
FIG. 3 is a diagram to explain a detection area where a base station apparatus can be detected.

The detection area where base station apparatuses RRH can be detected and the power consumption of the mobile terminal apparatus UE then hold the following relationship. FIG. 3 is a diagram to explain the detection area where base station apparatuses RRH can be detected. As shown in FIG. 3, when the target value is low, it is possible to secure a wide detection area and detect base station apparatuses RRH over a wide range. However, it is necessary to conduct measurements in a low SIR (Signal to Interference Ratio) environment, and the measurement effort and the measurement time in the mobile terminal apparatus UE increase, and the power consumption of the mobile terminal apparatus UE becomes high. On the other hand, when the target value is high, the measurement effort is lightened by improvement of the SIR, and the power consumption of the mobile terminal apparatus UE is kept low. However, the detection area becomes narrow, and it becomes difficult to detect base station apparatuses RRH.

Given this, there is a demand to improve the SIR without narrowing the detection area where base station apparatuses RRH can be detected. With this, there is a need to improve the signal quality from base station apparatuses RRH, and a method of detecting S-cells apart from the above-described PSS/SSS and CRSs is in demand.

Now, in Rel-11, a carrier without compatibility with existing component carriers of carrier aggregation is under study, and this is effective in a HetNet where carrier aggregation is applied. The carrier without compatibility with existing component carriers may be referred to as an "additional carrier type" or may be referred to as an "extension carrier."

Figure 4:
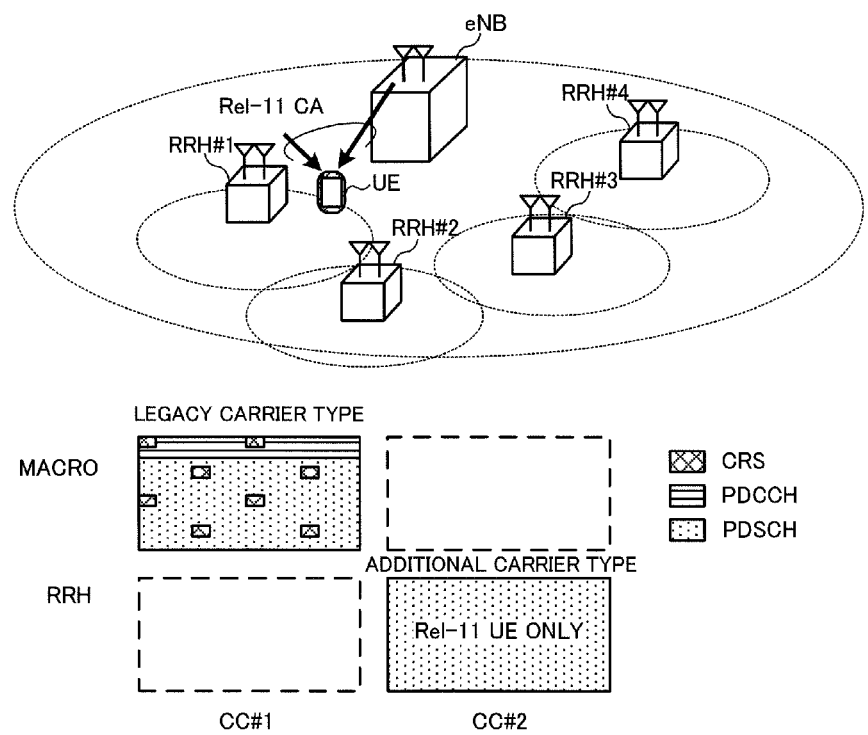
FIG. 4 is a diagram to show an example of carrier aggregation using an additional carrier type.

FIG. 4 is a diagram to show an example of carrier aggregation using the additional carrier type. Note that, in FIG. 4, CC #1 of the base station apparatus eNB is set in the legacy carrier type, and CC #2 of a base station apparatus RRH is set in the additional carrier type. Note that FIG. 4 only shows CRSs (Cell-specific Reference Signals), a PDCCH (Physical Downlink Control Channel), and a PDSCH (Physical Downlink Shared Channel), for ease of explanation.

As shown in FIG. 4, in the legacy carrier type, a PDCCH is set over three symbols from the top of one resource block defined in LTE. Also, in the legacy carrier type, in one resource block, CRSs are set not to overlap with user data and other reference signals such as DM-RSs (Demodulation-Reference Signals). The CRSs are used to demodulate user data, and, besides, used to measure downlink channel quality (CQI: Channel Quality Indicator) for scheduling and adaptive control, and used to measure an average downlink propagation path state for a cell search and handover (mobility measurement).

By contrast with this, with the additional carrier type, the PDCCH and CRSs can be made subject to "non-transmission." This additional carrier type is not supported by legacy mobile terminal apparatuses (Rel-10 and earlier versions), and is supported only by new mobile terminal apparatuses UE (Rel-11 and later versions). Also, the additional carrier type can make downlink control channels (PHICH and PCFICH) subject to non-transmission and make broadcast information (PBCH, Rel-8 SIB, and paging) subject to non-transmission as well. Also, the additional carrier type is presumed to be used primarily in S-cells (secondary cells).

Note that, with the additional carrier type, when CRSs are not transmitted, it is also possible to use, for example, DM-RSs for data demodulation and CSI-RSs (Channel State Information-Reference Signals) for CSI measurement. Also, with the additional carrier type, it is equally possible to transmit an FDM-type PDCCH when the PDCCH is not transmitted. The FDM-type PDCCH uses a predetermined frequency band of the PDSCH region for downlink data signals as an extended PDCCH region. The FDM-type PDCCH allocated to this extended PDCCH region is demodulated using DM-RSs. Note that an extended PDCCH may be referred to as a "UE-PDCCH."

With the additional carrier type, when the PDCCH is not transmitted, it is also possible to utilize cross-carrier scheduling. Cross-carrier scheduling refers to the method of transmitting the downlink control channel for the subject carrier using a different carrier. For example, instead of transmitting a downlink control channel using a carrier of the additional carrier type, the downlink control channel may be transmitted using a carrier of the legacy carrier type.

When the additional carrier type makes the PHICH (Physical Hybrid-ARQ Indicator Channel) subject to non-transmission, retransmission control may be executed based on downlink control information (DCI). When the additional carrier type makes the PCFICH (Physical Control Format Indicator Channel) subject to non-transmission, the number of OFDM symbols to use for the PDCCH may be reported through higher layer signaling. When the additional carrier type makes broadcast information subject to non-transmission, the broadcast information may be transmitted from a carrier of the legacy carrier type.

Note that, although an example of not transmitting CRSs and downlink control channels has been shown as the additional carrier type according to the present embodiment, this configuration is by no means limiting. For example, as the additional carrier type, it is equally possible to provide a configuration not to transmit at least one of CRSs and downlink control channels. Also, the bandwidth of the additional carrier type does not have to use the system band (base band: 20 MHz) of the LTE system as one unit, and can be changed as appropriate.

With the present system, interference due to CRSs is reduced by executing carrier aggregation using the legacy carrier type and the additional carrier type. That is, the additional carrier type can make CRSs subject to non-transmission, so that interference caused by CRSs from neighboring base station apparatuses RRH can be reduced. Also, by providing a configuration to transmit downlink data in resources for the CRS and the PDCCH, it is possible to improve spectral efficiency.

The present inventors have focused on the characteristic of the additional carrier type that the PDCCH and CRSs can be made subject to non-transmission, and arrived at the present invention by using this to detect S-cells used in carrier aggregation. That is, a gist of the present invention is to detect S-cells using signals (hereinafter referred to as "carrier detection signals") that are arranged with a high density in a carrier of an additional carrier type instead of the configuration to detect S-cells using a PSS/SSS and CRSs. By this means, the signal quality from base station apparatuses RRH is improved, and the measurement can be performed efficiently in a short time, and the power consumption of a mobile terminal apparatus can be kept low. Note that the carrier detection signal may be any signal that can be used to detect S-cells, and may be referred to as, for example, DS (Discovery Signal), PDCH (Physical Discovery Channel), BS (Beacon Signal), DPS (Discovery Pilot Signal) and so on.

This carrier detection signal should preferably have functions for executing long-cycle transmission, high-density transmission, providing orthogonality between cells, securing the number of sequences, providing a sequence that is adequate for generating delay profiles, and so on. Long-cycle transmission can reduce the opportunities for measurement by a mobile terminal apparatus by transmitting carrier detection signals once every several seconds in a concentrated manner, and reduce the power consumption of the mobile terminal apparatus. High-density transmission can improve received quality in the mobile terminal apparatus by allocating carrier detection signals to one subframe or to a number of consecutive subframes with a high density. By improving received quality, it is possible to shorten the measurement time by the mobile terminal apparatus and reduce the power consumption.

Orthogonality between cells can improve the received SIR, thereby shortening the time of measurement by a mobile terminal apparatus in a low SIR environment and reducing the power consumption. The number of carrier detection signal sequences should preferably be, for example, 504, which is the same as the number of cell IDs, or greater. Furthermore, a sequence that is adequate for generating delay profiles can be realized by allocating carrier detection signals to each subcarrier evenly. Note that the carrier detection signal does not have to have all the functions noted above, and has only to be transmitted with a high density, at least.

Figure 5:
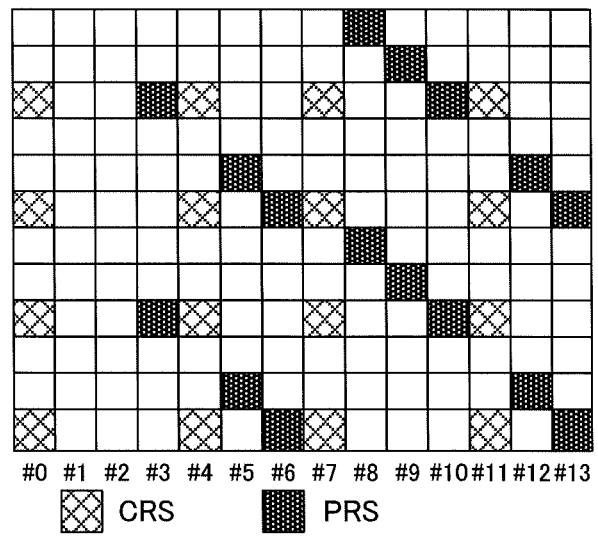
FIG. 5 is a diagram to explain a PRS.

As a reference signal that is close to a signal transmitted from a carrier and fulfills the above functions, there is a PRS (Positioning Reference Signal) defined in Rel-9. FIG. 5 is a diagram to explain the PRSs. A PRS is a reference signal to be used to measure position of a mobile terminal apparatus.

As shown in FIG. 5, in one resource block defined in LTE, PRSs are allocated to spread in the frequency direction and in the time axis direction. One resource block is formed with twelve subcarriers that are consecutive in the frequency direction and fourteen symbols that are consecutive in the time axis direction. PRSs are allocated to resource blocks to avoid the top three symbols for the PDCCH, namely symbols #0 to #2, and symbols #0, #4, #7 and #11 for CRSs. In each symbol avoiding the PDCCH and CRSs, the PRSs are allocated to two resource elements that are six subcarriers apart.

Also, the PRSs are shifted in the frequency direction on a per cell basis, so that interference between neighboring cells is reduced. In this case, PRSs are allocated at six-subcarrier intervals, so that maximum six orthogonal patterns can be defined. With PRSs, the system band, the transmission cycle, and the number of consecutive subframes can be set as parameters in higher layers. The transmission cycle can be set to 160 msec, 320 msec, 640 msec, and 1280 msec. Also, as for subframes, maximum six consecutive subframes can be transmitted.

In this way, PRSs satisfy most of the above-noted functions that are required of the carrier detection signal. Consequently, it is equally possible to use PRSs as a carrier detection signal for S-cell detection. However, the transmission cycle should preferably have options of longer cycles.

Figure 6:
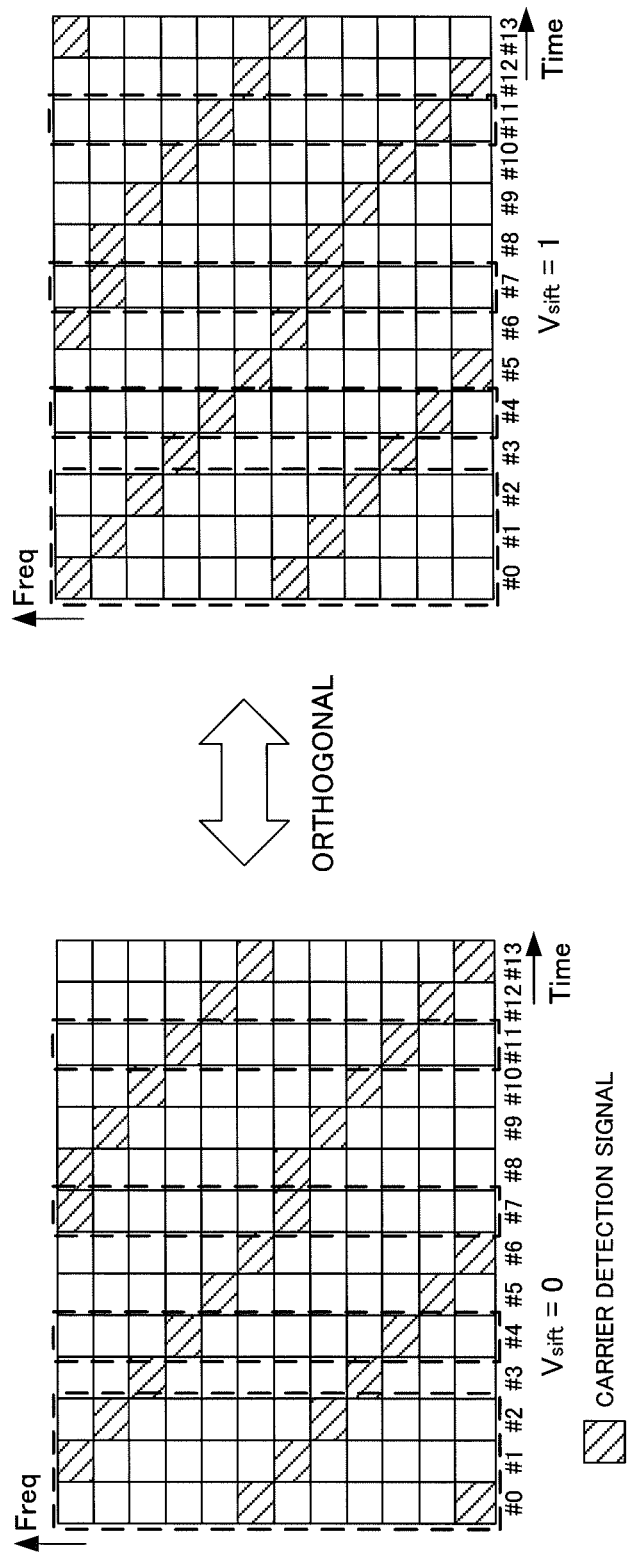
FIG. 6 is a diagram to show an example of a first signal configuration of a carrier detection signal.
Figure 7:
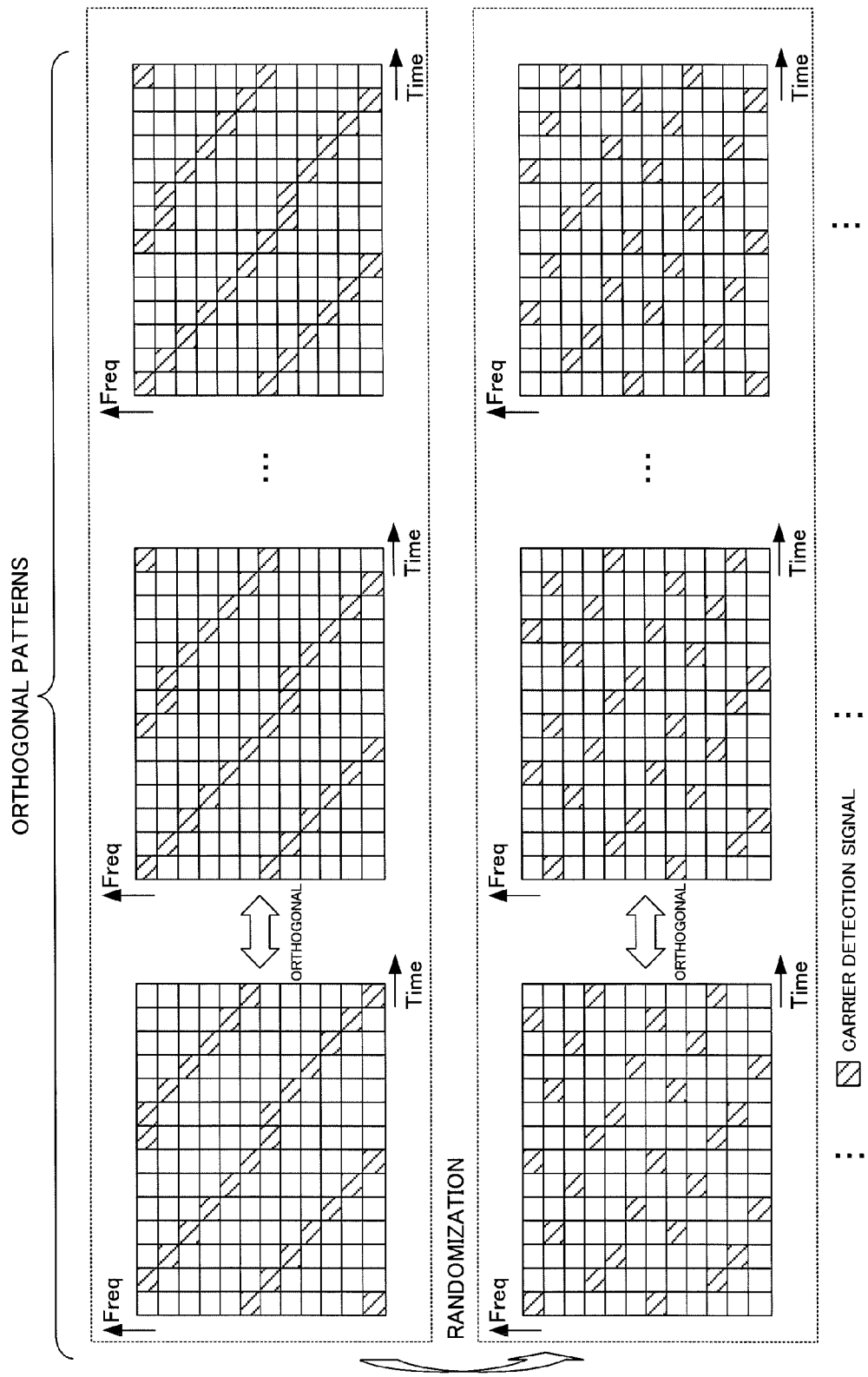
FIG. 7 is a diagram to show an example of a second signal configuration of a carrier detection signal.
Figure 8:
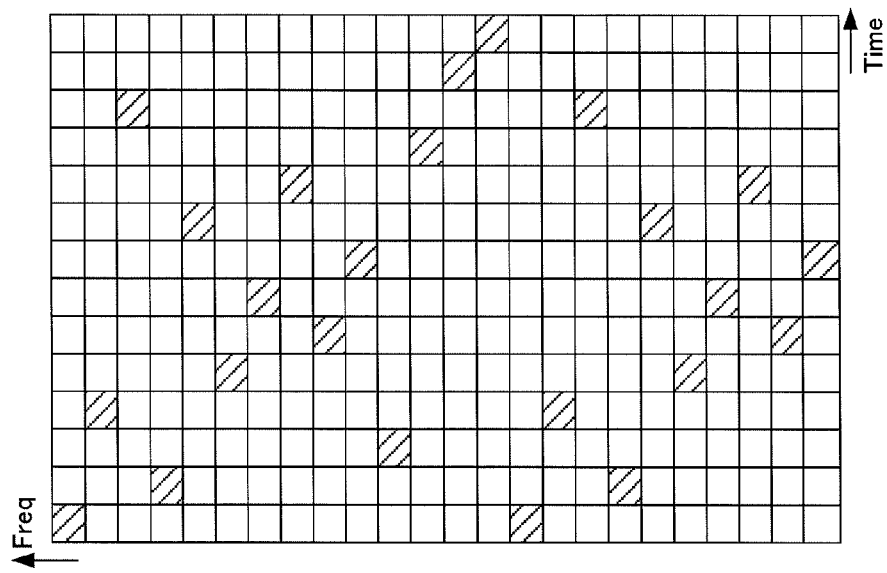
FIG. 8 is a diagram to show an example of a third signal configuration of a carrier detection signal.
Figure 8:
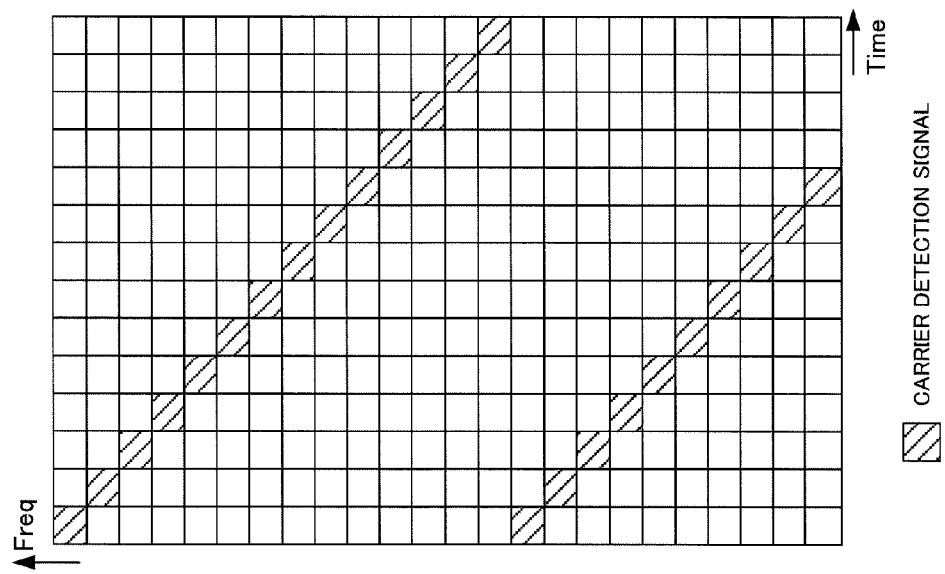
Figure 9:
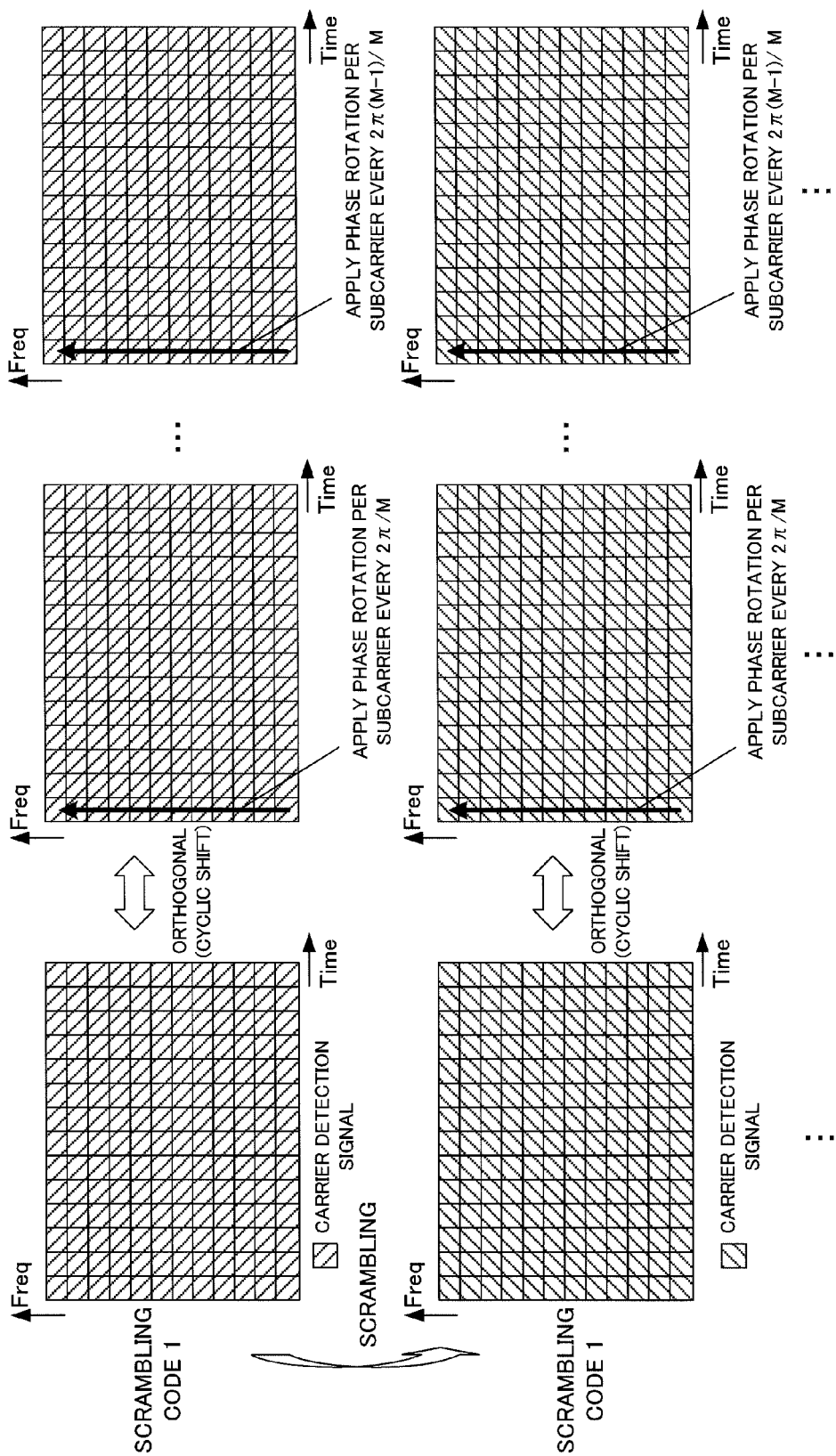
FIG. 9 is a diagram to show an example of a fourth signal configuration of a carrier detection signal.

Now, a carrier detection signal utilizing the characteristics of the PRS will be described below with reference to FIG. 6 to FIG. 9. FIG. 6 is a diagram to show an example of a first signal configuration of the carrier detection signal. FIG. 7 is a diagram to show an example of a second signal configuration of the carrier detection signal. FIG. 8 is a diagram to show an example of a third signal configuration of the carrier detection signal. FIG. 9 is a diagram to show an example of a fourth signal configuration of the carrier detection signal.

As shown in FIG. 6, in the first signal configuration, the allocation pattern of the carrier detection signal is defined to maintain the arrangement configuration of the PRS. With the additional carrier type, the PDCCH and CRS can be made subject to non-transmission. Consequently, it is possible to allocate the carrier detection signal to the resources of the PDCCH and CRSs (symbols #0 to #2, #4, #7 and #11). In the resources of the PDCCH and CRSs, the carrier detection signal is allocated to two resource elements that are six subcarriers apart, in an arrangement configuration in accordance with the PRS arrangement configuration.

By means of this configuration, with the first signal configuration, the carrier detection signal is allocated with a high density compared to the arrangement configuration of the PRS, and received quality is improved. Also, since the carrier detection signal is allocated at six-subcarrier intervals, so that six orthogonal patterns ($V_{shift}$=0-5) can be defined by shifting the allocation pattern in the frequency direction. In the example shown in FIG. 6, the allocation pattern $V_{shift}$=1 on the right side in the drawing is defined to be shifted through one subcarrier in the frequency direction with respect to the allocation pattern ($V_{shift}$=0) on the left side in the drawing.

Also, by allocating the carrier detection signal to six orthogonal patterns, six orthogonal sequences are generated. Furthermore, similar to the PRS, it is possible to support long-cycle transmission and high-density transmission by setting the parameters of the transmission cycle and the number of consecutive subframes with higher layers. Also, since the carrier detection signal is allocated to all subcarriers in one resource block, a sequence that is adequate to generate delay profiles is provided. Note that the first signal configuration has only to allocate carrier detection signals such that the carrier detection signals are distributed in the time axis direction and the frequency direction, and is by no means limited to a configuration to hold the arrangement configuration of the PRS.

As shown in FIG. 7, in the second signal configuration, a plurality of orthogonal patterns are made one group, and a plurality of patterns are generated by randomization between such groups. For example, given a basic allocation pattern, a plurality of mutually varying allocation patterns may be generated by randomizing the subcarriers on a per symbol basis. Following this, by using each allocation pattern as a reference and shifting this in the frequency direction, a plurality of groups of orthogonal patterns are defined. Although orthogonality is secured in the groups then, between the groups, part of the resources may become unorthogonal. However, by finding an average of all resources and calculating received quality, it is possible to reduce the influence of interference.

In this way, with the second signal configuration, compared to the first signal configuration, it is possible to increase the number of sequences by combining shifting in the frequency direction and randomization of allocation patterns. For example, by applying shifts in the frequency direction, six sequences can be generated, so that, if the number of groups is made 84 or more by randomization, it is possible to generate 504 sequences, which is the same number as the number of cell IDs, or generate even more sequences. Also, by setting the parameters of the transmission cycle and the number of consecutive subframes in higher layers in the same way as with the PRS, it is possible to support long-cycle transmission and high-density transmission. Also, since the carrier detection signals are allocated to all subcarriers in one resource block, a sequence that is adequate for generating delay profiles is provided.

Note that, in the second signal configuration, the method of randomizing the allocation patterns is not particularly limited. Also, although the randomized allocation patterns have only to be partly orthogonal at a minimum between the allocation patterns, it is preferable to design the patterns with minimal overlaps.

Also, each randomized group may be referred to as a non-orthogonal pattern.

As shown in FIG. 8, with the third signal configuration, allocation patterns are defined over a plurality of resource blocks. Consequently, the subcarrier interval between the carrier detection signals in each symbol is defined to be greater than in the allocation pattern of the first signal configuration. For example, an allocation pattern is defined over two resource blocks, and the carrier detection signals are allocated to two resource elements that are fourteen subcarriers apart. Consequently, by shifting the allocation patterns in the frequency direction, fourteen orthogonal patterns can be defined. In this way, with the third signal configuration, it is possible to increase the number of orthogonal patterns (orthogonal sequences) compared to the first and second signal configurations.

Also, by setting the parameters of the transmission cycle and the number of consecutive subframes in higher layers in the same way as with the PRS, it is possible to support long-cycle transmission and high-density transmission. Also, since the carrier detection signals are allocated to all subcarriers in one resource block, a sequence that is adequate for generating delay profiles is provided. Furthermore, with the third signal configuration, too, it is possible to increase the number of sequences by combining shifting in the frequency direction and randomization of allocation patterns. For example, by applying shifts in the frequency direction, fourteen sequences can be generated, so that, if the number of groups is made 36 or more by randomization, it is possible to generate 504 sequences, which is the same number as the number of cell IDs, or generate even more sequences.

Note that, although the subcarrier interval between the carrier detection signals in each symbol becomes greater and the density becomes lower, it is still possible to support these by increasing the number of consecutive subframes. Also, in the third signal configuration, the method of randomizing the allocation patterns is not particularly limited. Also, although the randomized allocation patterns have only to be partly orthogonal at a minimum between the allocation patterns, it is preferable to design the patterns with minimal overlaps. Also, each randomized allocation pattern may be referred to as a non-orthogonal pattern.

As shown in FIG. 9, with the fourth signal configuration, a configuration to generate orthogonal sequences using phase rotation in the frequency direction (cyclic shifts in the time axis direction) is defined. The carrier detection signals are allocated over all resource blocks. By applying a phase rotation to this signal sequence of the carrier detection signals in the frequency direction on a per subcarrier basis, a plurality of orthogonal sequences are generated. For example, by applying phase rotations through M rotations every $2\pi/M$, M orthogonal sequences are generated. To secure orthogonality by phase rotations, a phase gap of a certain degree or greater needs to be maintained, and the number of sequences that can be generated by phase rotations is limited.

In this case, it is possible to increase the number of sequences through phase rotations in the frequency direction and scrambling codes. For example, when 504 sequences, which is the same number as the number of cell IDs, or more are provided, M sequences can be generated through phase rotations in the frequency direction, so that 504/M scrambling codes are necessary. Also, by setting the parameters of the transmission cycle and the number of consecutive subframes in higher layers in the same way as with the PRS, it is possible to support long-cycle transmission and high-density transmission. Also, since the carrier detection signals are allocated to all subcarriers in one resource block, a sequence that is adequate for generating delay profiles is provided. Note that, with the fourth signal configuration, the method of scrambling signal sequences and the method of orthogonalization through cyclic shifts are not particularly limited.

Note that with the above-described first through fourth signal configurations, configurations to make the PDCCH and CRSs subject to non-transmission have been provided, these configurations are by no means limiting. It is equally possible to transmit one of the PDCCH and CRSs. With this configuration, still, carrier detection signals are allocated with a high density compared to the arrangement configuration of the PRS, so that received quality is improved.

Figure 10:
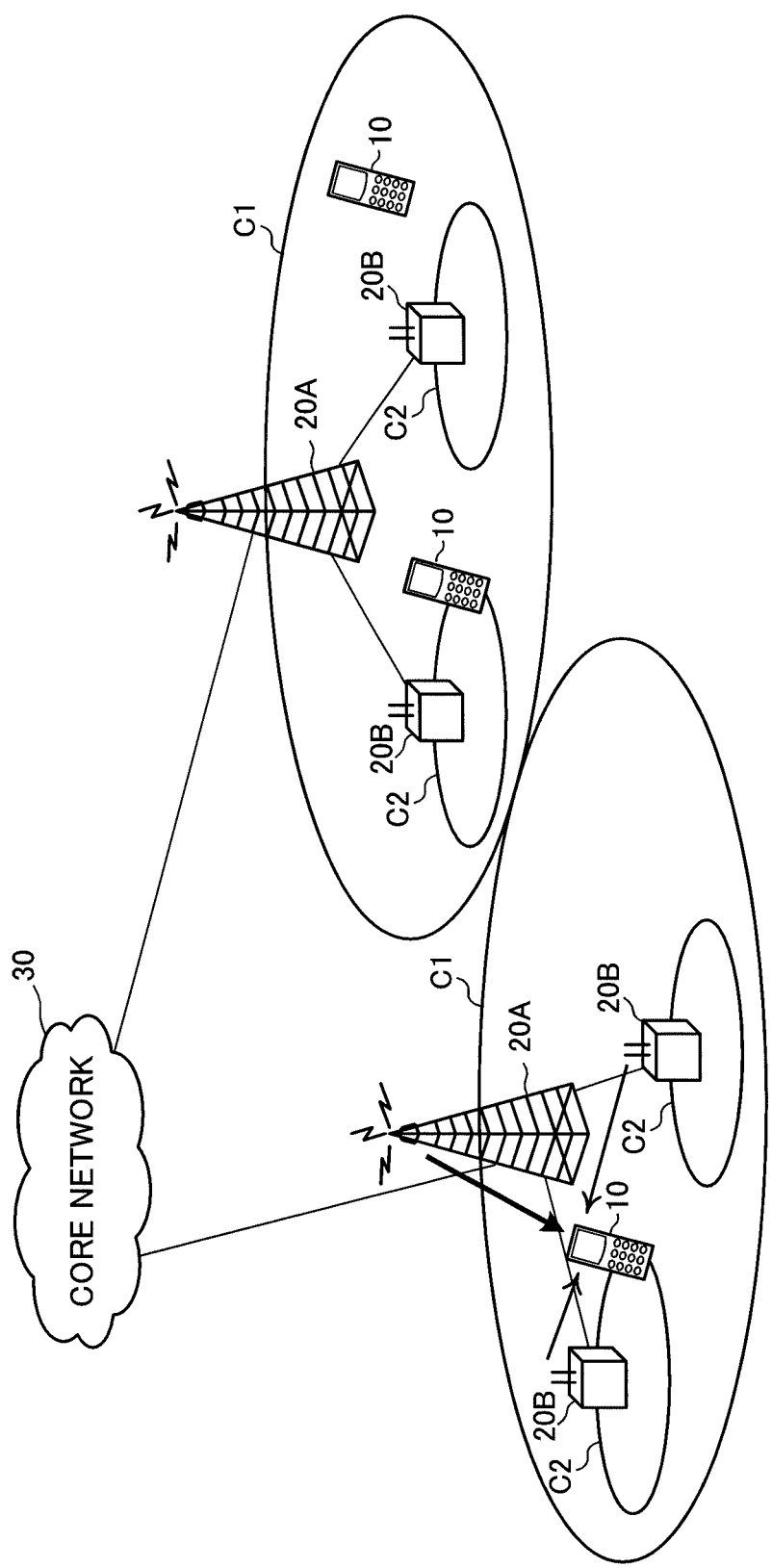
FIG. 10 is a diagram to explain a system configuration of a radio communication system.

Now, a radio communication system according to an embodiment of the present invention will be described in detail. FIG. 10 is a diagram to explain a system configuration of a radio communication system according to the present embodiment. Note that the radio communication system shown in FIG. 10 is a system to accommodate, for example, an LTE system or its successor system. In this radio communication system, carrier aggregation to group a plurality of fundamental frequency blocks into one, where the system band of the LTE system is one unit, is used. Also, this radio communication system may be referred to as "IMT-Advanced" or may be referred to as "4G."

As shown in FIG. 10, the radio communication system is a HetNet, and a layered network is built with a base station apparatus (first base station apparatus) 20A of a cell C1, and a plurality of base station apparatuses (second base station apparatuses) 20B of cells C2 that are provided in cell C1. The base station apparatus 20A is commonly referred to as a macro base station apparatus, and covers a large-scale cell C1. The base station apparatus 20B is commonly referred to as a RRH base station apparatus, and locally forms a small-scale cell C2 in cell C1. The base station apparatus 20A and each base station apparatus 20B are connected with each other by wire connection or by wireless connection. A mobile terminal apparatus 10 is able to communicate with the base station apparatuses 20A and 20B in cell 1 and in cells 2, respectively. Also, the base station apparatus 20A is connected with a core network 30 via a higher station apparatus.

Note that the higher station apparatus may be, for example, an access gateway apparatus, a radio network controller (RNC), a mobility management entity (MME) and so on, but is by no means limited to these. Although the mobile terminal apparatuses 10 include both legacy mobile terminal apparatuses (Rel-10 and earlier versions) and new mobile terminal apparatuses (Rel-11 and later versions), the following description will be given simply with respect to a "mobile terminal apparatus," unless specified otherwise. Also, although each mobile terminal apparatus 10 will be described to perform radio communication with the base station apparatuses 20A and 20B for ease of explanation, more generally, user equipment (UE) including mobile terminal apparatuses and fixed terminal apparatuses may be used.

This radio communication system supports carrier aggregation specialized for a HetNet. In this case, a mobile terminal apparatus 10 receives carrier detection signals from each base station apparatus 20B while being connected with the base station apparatus 20A. The mobile terminal apparatus 10 measures the signal quality from each base station apparatus 20B based on the carrier detection signals, and feeds back the measurement result to the base station apparatus 20A. Then, in accordance with the feedback from the mobile terminal apparatus 10, the base station apparatus 20A detects a base station apparatus 20B of good received quality as an S-cell, and executes carrier aggregation.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel).

Uplink communication channels include a PUSCH (Physical Uplink Shared Channel), which is an uplink data channel used by each mobile terminal apparatus on a shared basis, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 11:
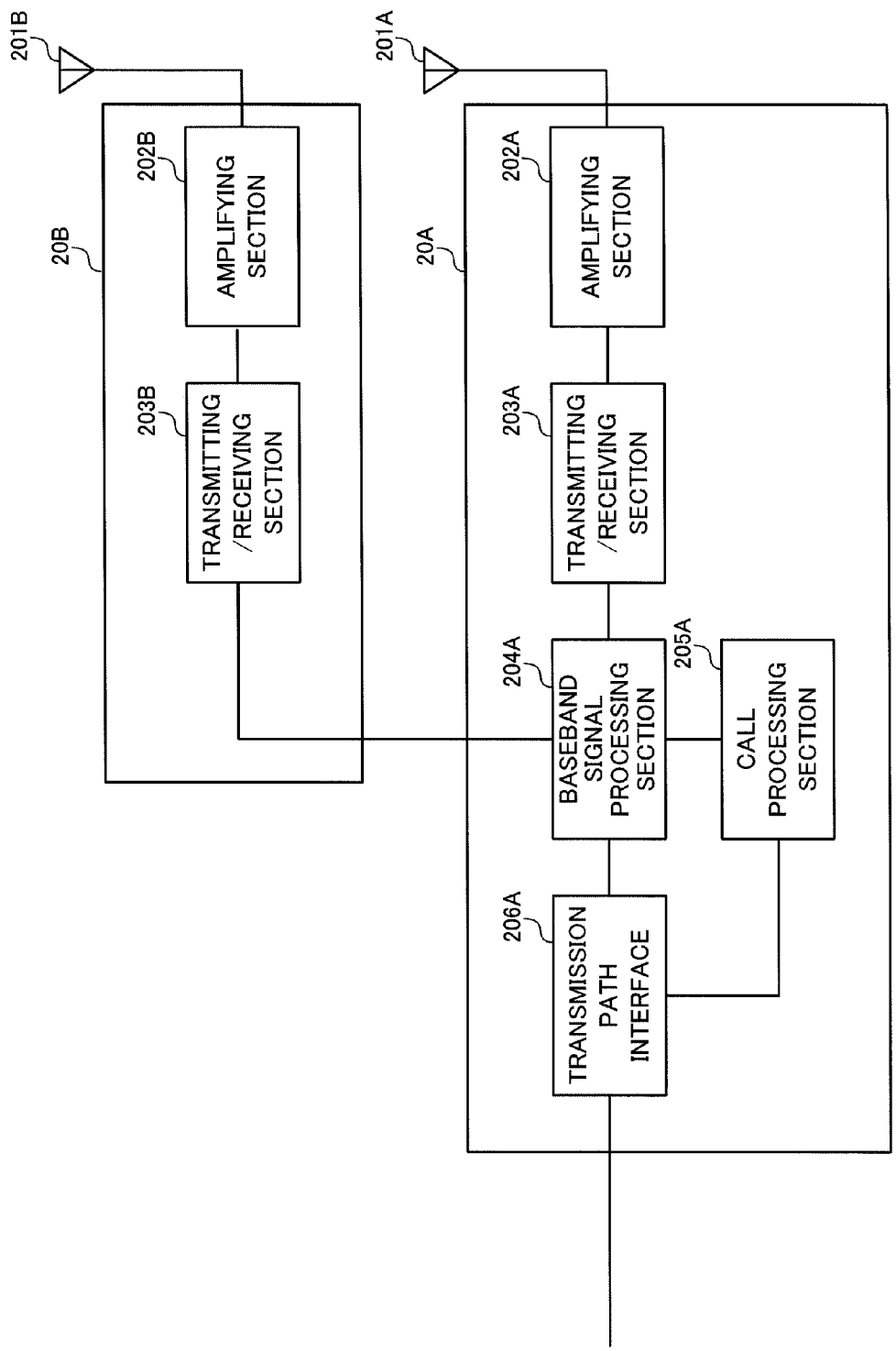
FIG. 11 is a diagram to explain an overall configuration of a base station apparatus.

Overall configurations of the base station apparatuses 20A and 20B according to the present embodiment will be described with reference to FIG. 11. Note that the baseband process is not executed in the base station apparatus 20B, and the base station apparatus 20B receives a baseband signal from the base station apparatus 20A and reports this to the mobile terminal apparatus 10.

The base station apparatus 20A has a transmitting/receiving antenna 201A, an amplifying section 202A, a transmitting/receiving section 203A, a baseband signal processing section 204A, a call processing section 205A, and a transmission path interface 206A. Also, the base station apparatus 20B has a transmitting/receiving antenna 201B, an amplifying section 202B, and a transmitting/receiving section 203B. Transmission data to be transmitted from the base station apparatuses 20A and 20B to the mobile terminal apparatus 10 on the downlink is input from the higher station apparatus into the baseband signal processing section 204A via the transmission path interface 206A.

In the baseband signal processing section 204A, a signal of a downlink data channel is subjected to, for example, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a downlink control channel is also subjected to transmission processes such as channel coding and an inverse fast Fourier transform.

Also, through a broadcast channel, the baseband signal processing section 204A reports control information that allows the mobile terminal apparatuses 10 to perform radio communication with the base station apparatuses 20A and 20B, to each mobile terminal apparatus 10 that is connected to the same cell. The information to allow communication in the cell includes, for example, the uplink or downlink system bandwidth, identification information of a root sequence (root sequence index) for generating random access preamble signals in the PRACH (Physical Random Access Channel), and so on.

In this case, the baseband signal of CC #1 is output from the baseband signal processing section 204A to the transmitting/receiving section 203A, and the baseband signal of CC #2 is output from the baseband signal processing section 204A to the transmitting/receiving section 203B of the base station apparatus 20B through optical fiber. The baseband signals that have been output from the baseband signal processing section 204A are converted into a radio frequency band in the transmitting/receiving sections 203A and 203B. The amplifying sections 202A and 202B amplify the radio frequency signals having been subjected to frequency conversion, and the results are transmitted from the transmitting/receiving antennas 201A and 201B.

Meanwhile, as for data to be transmitted from the mobile terminal apparatus 10 to the base station apparatuses 20A and 20B on the uplink, radio frequency signals that are received in the transmitting/receiving antennas 201A and 201B of the base station apparatuses 20A and 20B are amplified in the amplifying sections 202A and 202B, converted into baseband signals through frequency conversion in the transmitting/receiving sections 203A and 203B, and input in the baseband signal processing section 204A.

The baseband signal processing section 204A applies an FFT process, an IDFT process, error correction decoding, a MAC retransmission control receiving process, and RLC layer and PDCP layer receiving processes to the transmission data included in the baseband signals received as input. The baseband signals are transferred to the higher station apparatus via the transmission path interface 206A. The call processing section 205A performs call processing such as setting up and releasing communication channels, manages the state of the base station apparatuses 20A and 20B, and manages the radio resources.

Figure 12:
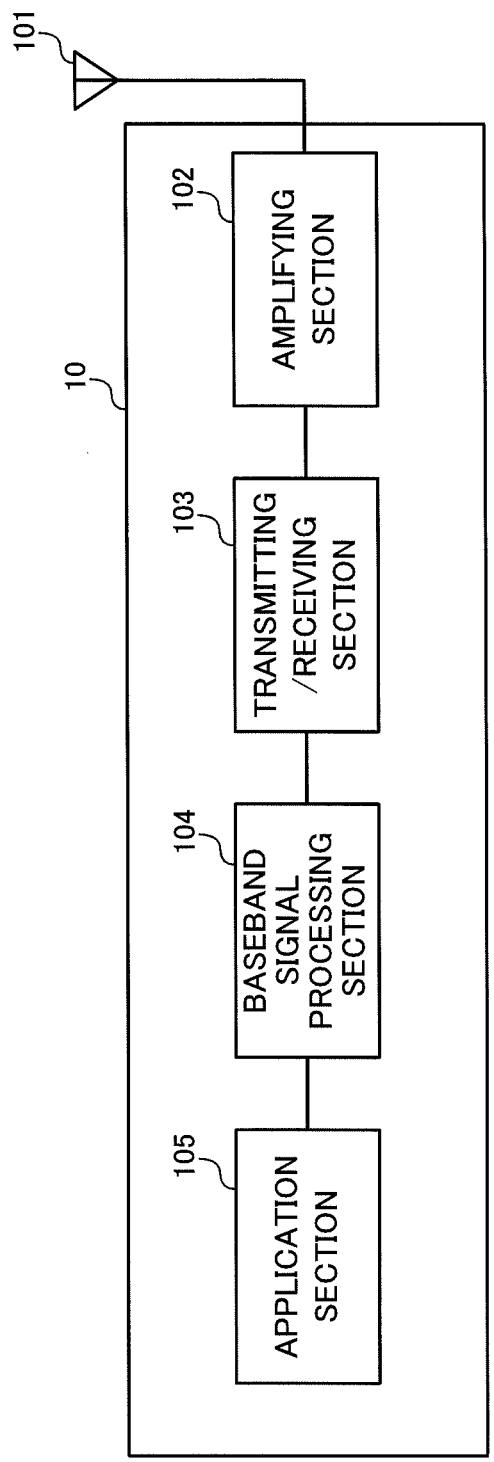
FIG. 12 is a diagram to explain an overall configuration of a mobile terminal apparatus.

Next, an overall configuration of a mobile terminal apparatus according to the present embodiment will be described with reference to FIG. 12. The mobile terminal apparatus 10 has a transmitting/receiving antenna 101, an amplifying section 102, a transmitting/receiving section 103 (receiving section), a baseband signal processing section 104, and an application section 105.

As for downlink data, a radio frequency signal that is received in the transmitting/receiving antenna 101 is amplified in the amplifying section 102, and converted into a baseband signal through frequency conversion in the transmitting/receiving section 103. This baseband signal is subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 to the baseband signal processing section 104. The baseband signal processing section 104 performs a mapping process, a retransmission control (H-ARQ) transmission process, channel coding, a DFT process, and an IFFT process. The baseband signal that is output from the baseband signal processing section 104 is converted into a radio frequency band in the transmitting/receiving section 103, and, after that, amplified in the amplifying section 102 and transmitted from the transmitting/receiving antenna 101.

Figure 13:
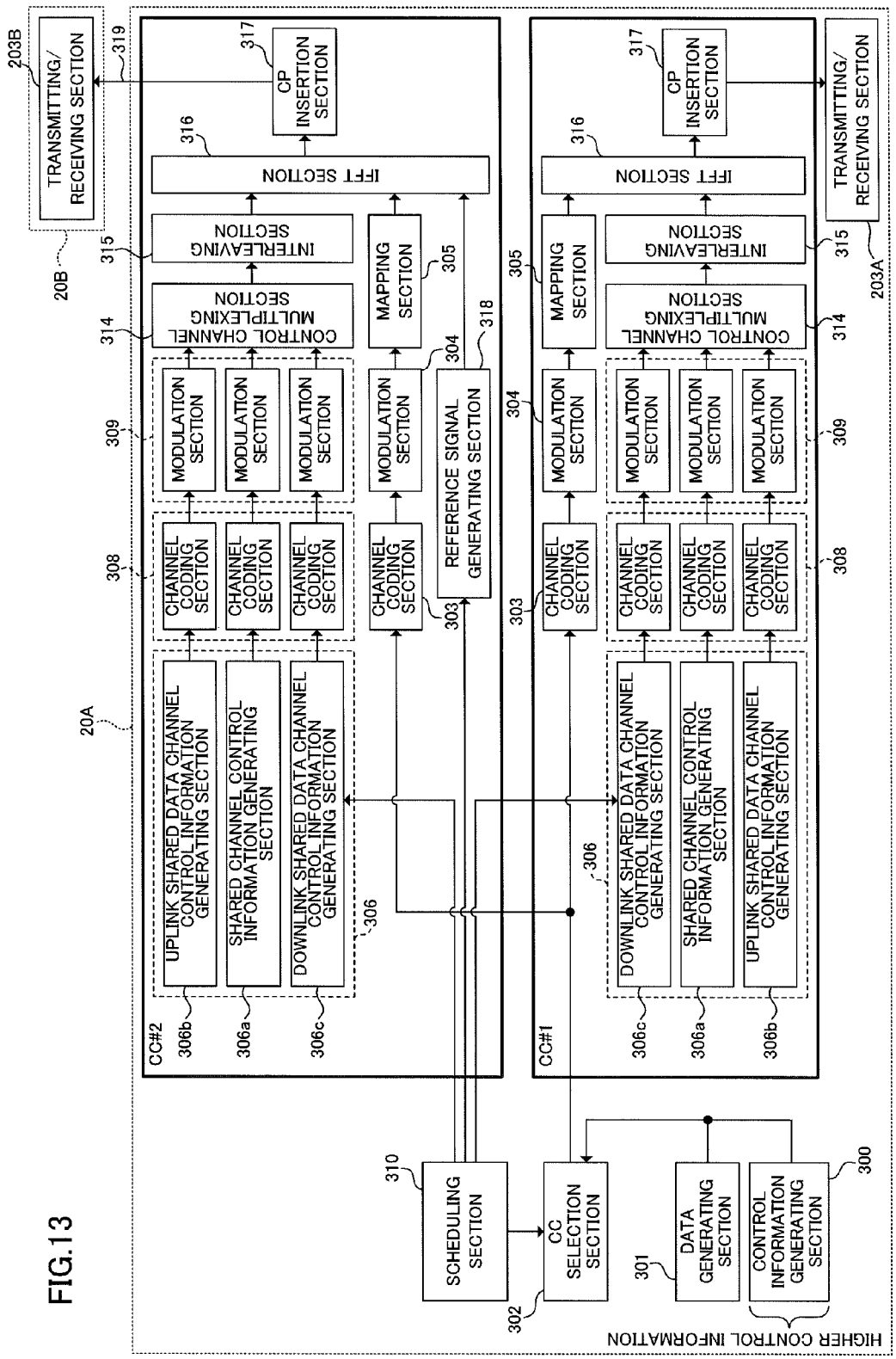
FIG. 13 is a functional block diagram of a baseband signal processing section provided in a base station apparatus and part of higher layers.

FIG. 13 is a functional block diagram of a baseband signal processing section 204A provided in the base station apparatus 20A according to the present embodiment and part of the higher layers, and primarily illustrates the function blocks for transmission processes in the baseband signal processing section 204A. Transmission data for the mobile terminal apparatus 10 under the base station apparatus 20A is transferred from the higher station apparatus to the base station apparatus 20A.

Note that, in FIG. 13, the base station apparatus 20A is shown as an example. Also, a case is shown here where the base station apparatus 20A uses two of CC #1 and CC #2. Obviously, the number of CCs each base station apparatus 20 uses is not limited to this. Also, CC #1 of the base station apparatus 20A is set in the legacy carrier type, and CC #2 is set in the additional carrier type.

A control information generating section 300 generates, per user, higher control information to report to the mobile terminal apparatus 10 through higher layer signaling. The higher control information may include the transmission cycle, the number of consecutive subframes and so on, which are parameters of the carrier detection signal. The transmission cycle is set to a long cycle of an interval of several seconds, so as to reduce the opportunities of measurement in the mobile terminal apparatus 10. Also, when the signal configurations 2, 3 and 4 of carrier detection signals are applied, group information and scrambling codes may be included in the higher control information. The group information refers to information that represents groups of orthogonal patterns that are grouped by randomization (see FIG. 7). Also, higher control information for the base station apparatus 20B may furthermore include sequence information representing as to which signal sequences are to be transmitted.

A control information generating section 300 may apply common group information or scrambling code with respect to each base station apparatus 20B in the same macro cell, and apply varying group information or scrambling codes with respect to base station apparatuses 20B in varying macro cells. By this means, it is possible to allocate orthogonal sequences to each base station apparatus 20B in the same macro cell, and secure orthogonality in the macro cell preferentially.

A data generating section 301 outputs transmission data transferred from the higher station apparatus as user data, on a per user basis. A component carrier selection section 302 selects, on a per mobile terminal apparatus 10, the component carriers to use for radio communication with the mobile terminal apparatus 10. When executing carrier aggregation, CC #1 of the base station apparatus 20A is used as the P-cell, and an S-cell is selected from other base station apparatuses 20B via optical fiber 319. An increase/decrease of component carriers is reported from the base station apparatus 20A to the mobile terminal apparatus 10 by higher layer signaling, and a message of completion of application is received from the mobile terminal apparatus 10.

The scheduling section 310 controls the allocation of component carriers to the subordinate mobile terminal apparatuses 10 according to the overall communication quality of the system band. The scheduling section 310 schedules LTE terminal users and LTE-A terminal users separately. The scheduling section 310 receives as input data and retransmission commands transmitted from the higher station apparatus, and also receives as input the channel estimation values and resource block CQIs from the receiving section having measured an uplink signal.

Also, the scheduling section 310 schedules downlink control channel signals and downlink shared channel signals with reference to the retransmission commands, the channel estimation values and the CQIs received as input. A propagation path in radio communication varies differently per frequency, due to frequency selective fading. So, the scheduling section 310 designates resource blocks (mapping positions) of good communication quality, on a per subframe basis, with respect to the downlink data for each mobile terminal apparatus 10 (which is referred to as "adaptive frequency scheduling"). In adaptive frequency scheduling, for each resource block, a mobile terminal apparatus 10 of good propagation path quality is selected. Consequently, the scheduling section 310 designates resource blocks (mapping positions), using the CQI of each resource block, fed back from each mobile terminal apparatus 10.

Likewise, the scheduling section 310 designates resource blocks of good communication quality, on a per subframe basis, with respect to the control information to be transmitted by the PDCCH and so on, by adaptive frequency scheduling. Consequently, the scheduling section 310 designates resource blocks (mapping positions), using the CQI of each resource block, fed back from each mobile terminal apparatus 10. Also, the MCS (coding rate and modulation scheme) that fulfills a predetermined block error rate with the allocated resource blocks is determined. Parameters to fulfill the MCS (coding rate and modulation scheme) determined in the scheduling section 310 are set in channel coding sections 303 and 308, and modulation sections 304 and 309. Note that adaptive frequency scheduling is applied not only to the base station apparatus 20A but is also applied to base station apparatuses 20B via optical fiber 319.

Also, the baseband signal processing section 204A has channel coding sections 303, modulation sections 304 and mapping sections 305 to support the maximum number of users to multiplex, N, in one component carrier. The channel coding sections 303 perform channel coding of the downlink shared data channel (PDSCH), which is formed with downlink data (including part of higher control signals) that is output from the data generating section 301, on a per user basis. The modulation sections 304 modulate user data having been subjected to channel coding, on a per user basis. The mapping sections 305 map the modulated user data to radio resources.

Also, the baseband signal processing section 204A has downlink control information generating sections 306 that generate downlink control information, channel coding sections 308 and modulation sections 309. In the downlink control information generating sections 306, uplink shared data channel control information generating sections 306b generate uplink scheduling grants (UL grants) for controlling an uplink data channel (PUSCH). The uplink scheduling grants are generated on a per user basis.

Also, downlink shared data channel control information generating sections 306c generate downlink scheduling assignments (DL assignments) for controlling a downlink data channel (PDSCH). The downlink scheduling assignments are generated on a per user basis. Also, shared channel control information generating sections 306a generate shared control channel control information, which is downlink control information that is common between users.

The control information that is modulated in the modulation sections 309 on a per user basis is multiplexed in the control channel multiplexing sections 314 and furthermore interleaved in interleaving sections 315. A control signal that is output from the interleaving sections 315 and user data that is output from the mapping sections 305 are input in IFFT sections 316 as downlink channel signals.

The baseband signal processing section 204A (CC #2) for the base station apparatus 20B has a reference signal generating section 318 (generating section) that generates reference signals. The reference signal generating section 318 generates carrier detection signals as reference signals based on the uplink control information. Note that the reference signal generating section 318 may generate a CRS for channel estimation, a DM-RS for downlink demodulation, and a CSI-RS for CSI measurement. Higher control information is reported from the control information generating section 300 to the reference signal generating section 318. With the first signal configuration, the transmission cycle of carrier detection signals, the number of consecutive subframes, and sequence information to represent signal sequences are reported as higher control information. For example, the amount of shift ($V_{shift}$) of carrier detection signals may be reported as sequence information. In this case, signal sequences that are defined by the amount of shift are used (see FIG. 6). Note that, when the amount of shift and cell IDs are associated on a one-by-one basis, it is not necessary to report the amount of shift.

With the second and third signal configurations, the transmission cycle of carrier detection signals, the number of consecutive subframes, group information, and sequence information are reported as higher control information. For example, the amount of shift ($V_{shift}$) of carrier detection signals may be reported as sequence information. In this case, signal sequences that are defined by group information and the amount of shift are used (see FIGS. 7 and 8). Note that, when the amount of shift and cell IDs are associated on a one-by-one basis, it is not necessary to report the amount of shift. With the fourth signal configuration, the transmission cycle of carrier detection signals, the number of consecutive subframes, scrambling codes and sequence information are reported as higher control information. For example, the phase rotation angle may be reported as sequence information. In this case, signal sequences that are defined by scrambling codes and the phase rotation angle are used (see FIG. 9). Note that, when the phase rotation angle and cell IDs are associated on a one-by-one basis, it is not necessary to report the phase rotation angle.

In the IFFT sections 316, as downlink channel signals, a control signal is input from the interleaving sections 315, and user data is input from the mapping sections 305. Also, in the IFFT section 316 (CC #2) for the base station apparatus 20B, a downlink reference signal is furthermore input from the reference signal generating section 318. The IFFT sections 316 perform an inverse fast Fourier transform of the downlink channel signal and the downlink reference signal and converts frequency domain signals into time sequence signals. Cyclic prefix insertion sections 317 insert cyclic prefixes in the time sequence signal of the downlink channel signal. Note that a cyclic prefix functions as a guard interval for cancelling the differences in multipath propagation delay. Transmission data, to which cyclic prefixes have been added, is transmitted to the transmitting/receiving sections 203A and 203B.

Note that, in FIG. 13, it is possible to set all subframes in CC #2 in the additional carrier type, or set predetermined subframes in the additional carrier type and set the rest of the subframes in the legacy carrier type. In this case, it is possible to connect not only new mobile terminal apparatuses (Rel-11 and later versions) to CC #2 of the base station apparatus 20B but also allow legacy mobile terminal apparatuses (Rel-10 or earlier versions) to connect as well.

Figure 14:
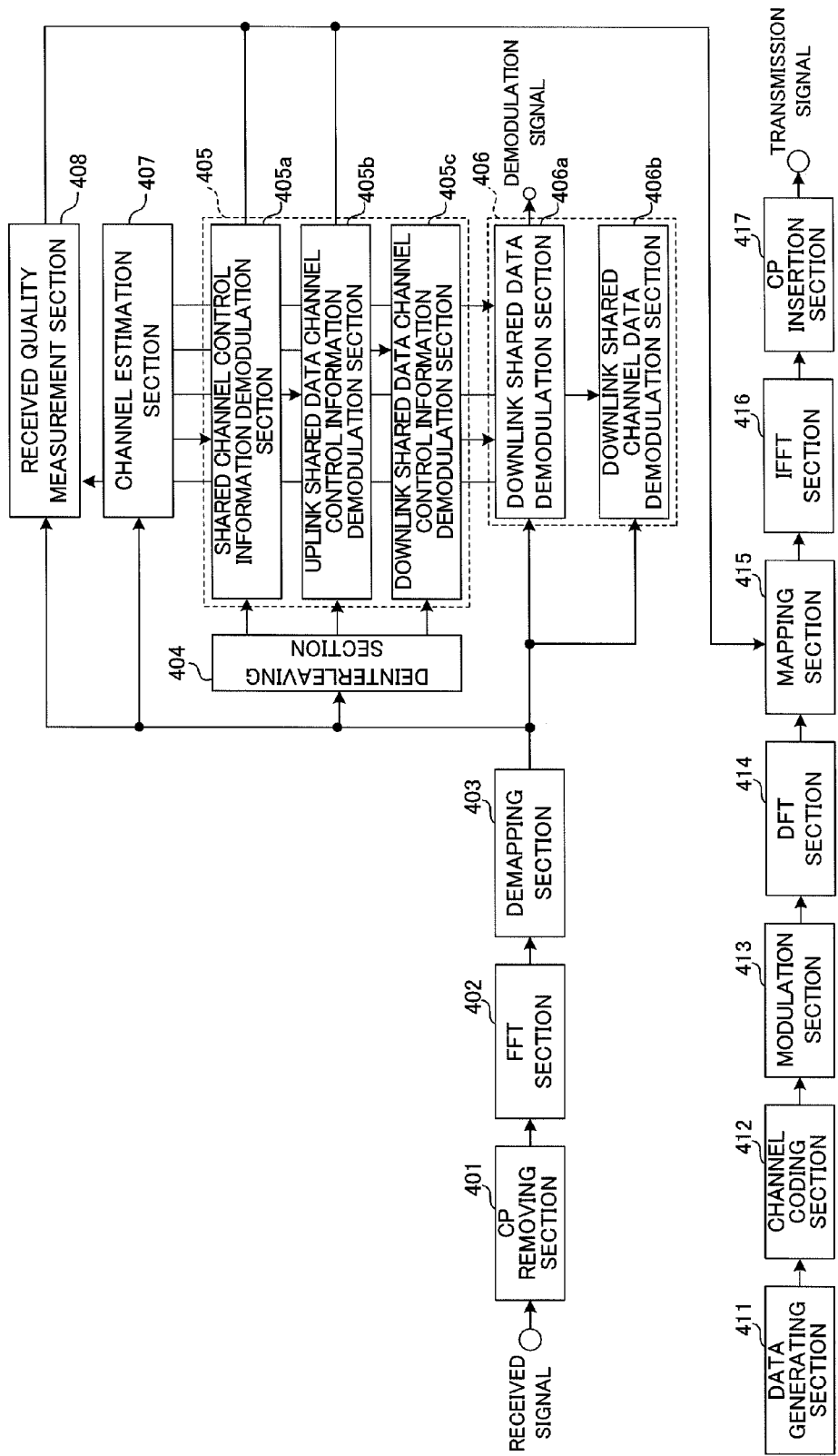
FIG. 14 is a functional block diagram of a baseband signal processing section provided in a mobile terminal apparatus.

FIG. 14 shows a functional block diagram of the baseband signal processing section 104 provided in the mobile terminal apparatus 10, and shows the function blocks of an LTE-A terminal that supports the additional carrier type.

A downlink signal that is received from the base station apparatuses 20A and 20B as received data has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information that is output from the demapping section 403 is deinterleaved in a deinterleaving section 404.

Also, the baseband signal processing section 104 has a downlink control information demodulation section 405 that demodulates downlink control information, a data demodulation section 406 that demodulates downlink shared data, a channel estimation section 407, and a received quality measurement section (measurement section) 408. The downlink control information demodulation section 405 includes a shared channel control information demodulation section 405a that demodulates shared control channel control information from the multiplexed control information, an uplink shared data channel control information demodulation section 405b that demodulates uplink shared data channel control information from the multiplexed control information, and a downlink shared data channel control information demodulation section 405c that demodulates downlink shared data channel control information from the multiplexed control information.

The shared channel control information demodulation section 405a extracts shared control channel control information, which is control information that is common between users, by performing a blind decoding process, a demodulation process, a channel decoding process and so on of the common search spaces of the downlink control channel (PDCCH). The shared control channel control information includes downlink channel quality information (CQI), and is input in a mapping section 415 and mapped as part of transmission data for the base station apparatus 20.

The uplink shared data channel control information demodulation section 405b extracts uplink shared data channel control information (for example, UL grants) by performing a blind decoding process, a demodulation process, a channel decoding process and so on of the user-specific search spaces of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL assignments) by performing a blind decoding process, a demodulation process, a channel decoding process and so on of the user-specific search spaces of the downlink control channel (PDCCH). The demodulated downlink shared data channel control information is input in the data demodulation section 406, used to control the downlink shared data channel (PDSCH), and input in a downlink shared data demodulation section 406a.

The data demodulation section 406 includes the downlink shared data demodulation section 406a that demodulates user data and higher control signals, and a downlink shared channel data demodulation section 406b that demodulates downlink shared channel data.

The downlink shared data demodulation section 406a acquires user data and higher control information based on the downlink shared data channel control information that is input from the downlink shared data channel control information demodulation section 405c. The downlink shared channel data demodulation section 406b demodulates downlink shared channel data based on the uplink shared data channel control information that is input from the uplink shared data channel control information demodulation section 405b. The data demodulation section 406 performs derate matching by switching the rate matching pattern depending on the carrier type of component carriers. For example, with component carriers of the additional carrier type, the demodulation process is performed adequately taking into account the user data allocated to the resources of CRSs and the PDCCH.

The channel estimation section 407 performs channel estimation using user-specific reference signals (DM-RSs) or cell-specific reference signals (CRSs). When demodulating subframes of the legacy carrier type, channel estimation is performed using CRSs or DM-RSs. On the other hand, when demodulating subframes of the additional carrier type, channel estimation is performed using DM-RSs. The channel estimation section 407 outputs the estimated channel variation to the shared channel control information demodulation section 405a, the uplink shared data channel control information demodulation section 405b, the downlink shared data channel control information demodulation section 405c and the downlink shared data demodulation section 406a. In these demodulation sections, the demodulation process is performed using the estimated channel variation and reference signals for demodulation.

The received quality measurement section 408 measures received quality based on the carrier detection signals transmitted in CC #2 of the additional carrier pattern from each base station apparatus 20B. Higher control information is input in the received quality measurement section 408 from the downlink shared data demodulation section 406a. With the first signal configuration, the transmission cycle of carrier detection signals and the number of consecutive subframes are input in the received quality measurement section 408 as higher control information. The received quality measurement section 408 measures the orthogonal sequences of all (for example, six) orthogonal patterns at times specified by the transmission cycle and the number of consecutive subframes.

In the event of the second and third signal configurations, the transmission cycle of carrier detection signals, the number of consecutive subframes, and group information are input in the received quality measurement section 408 as higher control information. The received quality measurement section 408 measures the orthogonal sequences of all orthogonal patterns in the group represented in the group information, at times specified by the transmission cycle and the number of consecutive subframes. Note that a plurality of pieces of group information may be input in the received quality measurement section 408. In this case, the received quality measurement section 408 measures all the orthogonal sequences in a plurality of groups.

In the event of the fourth signal configuration, the transmission cycle of carrier detection signals, the number of consecutive subframes and scrambling codes are input in the received quality measurement section 408 as higher control information. The received quality measurement section 408 measures all the orthogonal sequences generated by scrambling and phase rotations, at times specified by the transmission cycle and the number of consecutive subframes. Note that a plurality of scrambling codes may be input in the received quality measurement section 408 as well. In this case, the received quality measurement section 408 measures all the orthogonal sequences generated by scrambling and phase rotations by a plurality of scrambling codes.

Note that sequence information to represent specific signal sequences may be input in the received quality measurement section 408 as higher control information. By this means, the received quality measurement section 408 does not have to measure all the orthogonal patterns, so that the measurement effort can be lightened.

If, at this time, the transmission cycle is set to be a long cycle, the opportunities of measurement in the received quality measurement section 408 are reduced, so that it is possible to reduce the power consumption. Also, if consecutive subframes are set, improvement of received quality shortens the measurement time in the received quality measurement section 408, and the power consumption is reduced. Also, since the orthogonality of signal sequences is taken into account, the time of measurement by the received quality measurement section 408 under a low SIR environment becomes shorter, and the power consumption is reduced. Note that when orthogonal sequences are allocated to each base station apparatus 20B in the same macro cell and orthogonal sequences of different groups are allocated between varying macro cells, it may be possible to measure only the orthogonal sequences in the macro cell where the subject apparatus belongs. In this case, common group information and scrambling code are allocated to each base station apparatus 20B in the same macro cell.

The received quality measurement section 408 outputs the received quality measurement result to the mapping section 415, and sends feedback to the base station apparatus 20A. The received quality measurement result may be fed back from the mobile terminal apparatus 10 to the base station apparatus 20A directly, or may be fed back from the mobile terminal apparatus 10 to the base station apparatus 20A via the base station apparatus 20B. Note that, in the first to third signal configurations, the variations of orthogonal patterns may be defined in advance, or may be reported to the mobile terminal apparatus 10. Also, with the fourth signal configuration, the phase rotation angle may be defined in advance, or may be reported to the mobile terminal apparatus 10. Also, the transmission cycle, the number of consecutive subframes, group information and scrambling codes may be reported through a downlink control channel or a broadcast channel, instead of being reported through higher layer signaling.

The baseband signal processing section 104 has, as function blocks of the transmission processing system, a data generating section 411, a channel coding section 412, a modulation section 413, a DFT section 414, a mapping section 415, an IFFT section 416, and a CP insertion section 417. The data generating section 411 generates transmission data from bit data that is received as input from the application section 105. The channel coding section 412 performs a channel coding process such as error correction for the transmission data, and the modulation section 413 modulates the transmission data after the channel coding by QPSK and so on.

The DFT section 414 performs a discrete Fourier transform on the modulated transmission data. The mapping section 415 maps the frequency components of the data symbols after the DFT, to subcarrier positions designated by the base station apparatuses 20A and 20B. The IFFT section 416 converts the input data, which corresponds to the system band, into time sequence data by performing an inverse fast Fourier transform, and the CP insertion section 417 inserts cyclic prefixes in the time sequence data in data units.

In the mobile terminal apparatus 10 configured in this way, the received quality measurement results of signal sequences from the base station apparatuses 20B and the target value are compared, and the measurement results of base station apparatuses 20B (S-cells) where signal sequences of good received quality are allocated are fed back. Then, based on the measurement results fed back, the base station apparatus 20A executes carrier aggregation between the base station apparatus 20A and the detected (discovered) base station apparatuses 20B.

As described above, with the communication system according to the present embodiment, it is possible to make CRSs and the PDCCH subject to non-transmission in an additional carrier pattern, so that it is possible to transmit carrier detection signals from a base station apparatus 20B to a mobile terminal apparatus 10 with a high density. Consequently, in the mobile terminal apparatus 10, the signal quality from the base station apparatus 20B measured with the carrier detection signals improves, and the effort of the mobile terminal apparatus 10 for measuring received quality is lightened. Consequently, the mobile terminal apparatus 10 is able to detect an S-cell in a short time and reduce the power consumption.

The present invention is by no means limited to the above embodiments and can be implemented in various modifications. For example, without departing from the scope of the present invention, it is possible to adequately change the number of carriers, the bandwidth of carriers, the signaling method, the type of the additional carrier type, the number of processing sections, the order of processing steps in the above description, and implement the present invention. Besides, the present invention can be implemented with various changes, without departing from the scope of the present invention.

The disclosure of Japanese Patent Application No. 2012-017358, filed on Jan. 30, 2012, including the specification, drawings and abstract, is incorporated herein by reference in its entirety.

The invention claimed is:

1. A communication system employing carrier aggregation using a first carrier and a second carrier that is allocated in addition to the first carrier, the system comprising:
   a first base station apparatus and a mobile terminal apparatus that communicate using the first carrier; and
   a second base station apparatus that communicates with the mobile terminal apparatus using the second carrier, wherein the first base station apparatus comprises: a generating circuit that generates a carrier detection signal to make the mobile terminal apparatus detect the second carrier, such that the carrier aggregation is executed with the first carrier; and
      a transmission circuit that transmits the carrier detection signal to the second base station apparatus, such that the carrier detection signal is transmitted from the second base station apparatus to the mobile terminal apparatus using the second carrier in which the carrier detection signal is allocated with a higher density than a reference signal of the first carrier; and
   wherein the mobile terminal apparatus comprises:
      a receiving circuit that receives the carrier detection signal from the second base station apparatus, wherein, in the second carrier, based on an allocation pattern of the carrier detection signal distributed in a time axis direction and in a frequency direction in one resource block as a reference, a plurality of orthogonal patterns that are given by shifting the allocation pattern in the frequency direction are defined, and wherein, in the second carrier, based on a plurality of mutually varying allocation patterns as a reference, a plurality of orthogonal patterns that are given by shifting each of the plurality of allocation patterns in the frequency direction are defined.

2. The communication system according to claim 1, wherein, in the second carrier, the carrier detection signal is defined to be allocable in a longer cycle than the reference signal that makes the mobile terminal apparatus detect the first carrier.

3. The communication system according to claim 1, wherein, in the second carrier, the carrier detection signal is defined to be allocable to a plurality of consecutive subframes.

4. The communication system according to claim 1, wherein, in the second carrier, the carrier detection signal is defined to be allocable to all symbols in one resource block including top three symbols.

5. The communication system according to claim 1, wherein the allocation pattern is defined to hold at least an arrangement configuration of a PRS (Positioning Reference Signal).

6. A base station apparatus employing that, through carrier aggregation using a first carrier and a second carrier that is allocated in addition to the first carrier; the base station apparatus communicates with a mobile terminal apparatus that is connected with another base station apparatus using the second carrier, using the first carrier, the base station apparatus comprising:

a generating circuit that generates a carrier detection signal to make the mobile terminal apparatus detect the second carrier, such that the carrier aggregation is executed with the first carrier; and a transmission circuit that transmits the carrier detection signal to another base station apparatus, such that the carrier detection signal is transmitted from another base station apparatus to the mobile terminal apparatus using the second carrier in which the carrier detection signal is allocated with a higher density than a reference signal of the first carrier, wherein, in the second carrier, based on an allocation pattern of the carrier detection signal distributed in a time axis direction and in a frequency direction in one resource block as a reference, a plurality of orthogonal patterns that are given by shifting the allocation pattern in the frequency direction are defined, and wherein, in the second carrier, based on a plurality of mutually varying allocation patterns as a reference, a plurality of orthogonal patterns that are given by shifting each of the plurality of allocation patterns in the frequency direction are defined.

7. A mobile terminal apparatus employing, carrier aggregation using a first carrier and a second carrier that is allocated in addition to the first carrier; the mobile terminal apparatus communicates with a first base station apparatus using the first carrier and communicates with a second base station apparatus using the second carrier, the mobile terminal apparatus comprising:

a receiving circuit that receives a carrier detection signal for detecting the second carrier, from the second base station apparatus, in the second carrier, in which the carrier detection signal is allocated with a higher density than a reference signal of the first carrier, such that the carrier aggregation is executed with the first carrier; and a measurement circuit that measures received quality based on the carrier detection signal, wherein, in the second carrier, based on an allocation pattern of the carrier detection signal distributed in a time axis direction and in a frequency direction in one resource block as a reference, a plurality of orthogonal patterns that are given by shifting the allocation pattern in the frequency direction are defined, and wherein, in the second carrier, based on a plurality of mutually varying allocation patterns as a reference, a plurality of orthogonal patterns that are given by shifting each of the plurality of allocation patterns in the frequency direction are defined.

* * * * *